US010360777B2

(12) United States Patent
Lauria et al.

(10) Patent No.: US 10,360,777 B2
(45) Date of Patent: Jul. 23, 2019

(54) SYSTEM FOR AND METHOD OF ENHANCED READING AND TRACKING OF RADIO FREQUENCY IDENTIFICATION TAGS

(71) Applicant: SYMBOL TECHNOLOGIES, LLC, Lincolnshire, IL (US)

(72) Inventors: Charles Lauria, Miller Place, NY (US); Richard J. Lavery, Huntington, NY (US); Russell E. Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 126 days.

(21) Appl. No.: 14/829,717

(22) Filed: Aug. 19, 2015

(65) Prior Publication Data
US 2017/0053505 A1    Feb. 23, 2017

(51) Int. Cl.
| G08B 13/14 | (2006.01) |
| G08B 13/24 | (2006.01) |
| G06Q 10/08 | (2012.01) |
| G06K 7/00 | (2006.01) |

(52) U.S. Cl.
CPC ......... *G08B 13/246* (2013.01); *G06K 7/0008* (2013.01); *G06Q 10/087* (2013.01)

(58) Field of Classification Search
CPC ... G08B 13/246; G06K 7/0008; G06Q 10/087
USPC .......................... 340/572.1–572.9, 10.1–10.6
See application file for complete search history.

(56) References Cited

U.S. PATENT DOCUMENTS

| 7,298,264 | B1 | 11/2007 | Kuzma et al. | |
| 7,978,050 | B2* | 7/2011 | Moshfeghi | H04L 47/10 340/10.2 |
| 2001/0018665 | A1* | 8/2001 | Sullivan | G06Q 20/20 705/14.65 |
| 2003/0007473 | A1* | 1/2003 | Strong | G01S 5/02 370/338 |
| 2005/0109844 | A1 | 5/2005 | Hilliard | |
| 2006/0208890 | A1* | 9/2006 | Ehrman | G06Q 10/08 340/572.1 |
| 2007/0052524 | A1* | 3/2007 | Tanaka | G06K 7/0008 340/10.2 |
| 2008/0024275 | A1 | 1/2008 | Quan et al. | |
| 2008/0052037 | A1* | 2/2008 | Bodin | G06Q 10/087 702/173 |
| 2008/0088414 | A1* | 4/2008 | Suga | G06K 7/0008 340/10.1 |

(Continued)

OTHER PUBLICATIONS

International Search Report and Written Opinion for corresponding International Patent Application No. PCT/US2016/037326 dated Sep. 12, 2016.

*Primary Examiner* — Kerri L McNally
*Assistant Examiner* — Thang D Tran
(74) *Attorney, Agent, or Firm* — Yuri Astvatsaturov

(57) ABSTRACT

Radio frequency identification (RFID) tags that pass through a portal in a venue are read by a portal RFID reader, and identified as being tags having a higher priority as compared to other RFID tags in the venue that have a lower priority. The identities of the high-priority tags are transmitted to an overhead RFID reader, which preferentially reads the high-priority tags over the low-priority tags in the venue. Only the high-priority RFID tags are located and tracked in the venue.

15 Claims, 4 Drawing Sheets

(56) References Cited

U.S. PATENT DOCUMENTS

| | | | |
|---|---|---|---|
| 2008/0297312 A1* | 12/2008 | Moshfeghi | H04L 47/10 340/10.1 |
| 2009/0313142 A1* | 12/2009 | Hiruma | G06Q 10/087 705/28 |
| 2010/0148930 A1* | 6/2010 | Silverbrook | A63F 9/183 340/10.1 |
| 2010/0156651 A1* | 6/2010 | Broer | G01S 13/74 340/670 |
| 2014/0159872 A1* | 6/2014 | Bekritsky | G06K 7/10079 340/10.5 |
| 2015/0102908 A1* | 4/2015 | Griesmann | G06K 7/10198 340/10.1 |
| 2015/0323662 A1* | 11/2015 | Swope | G06K 7/10366 342/158 |

* cited by examiner

SYSTEM FOR AND METHOD OF ENHANCED READING AND TRACKING OF RADIO FREQUENCY IDENTIFICATION TAGS

BACKGROUND OF THE INVENTION

The present disclosure relates generally to a system for, and a method of, reading and tracking of radio frequency (RF) identification (RFID) tags associated with items located in a venue, and, more particularly, to enhancing the RFID reading performance, especially of high-priority tags that are moved in the venue.

Radio frequency (RF) identification (RFID) technology is becoming increasingly important for logistics concerns, material handling and inventory management in retail stores, warehouses, distribution centers, buildings, and like venues. An RFID system typically includes an RFID reader, also known as an RFID interrogator, and preferably a plurality of such readers deployed about the venue. Each RFID reader interrogates multiple RFID tags in its coverage range. Each RFID tag is usually attached to, or associated with, an individual item, or to a package for the item, or to a pallet or container for multiple items. Each RFID tag typically includes an antenna, a power management section, a radio section, and frequently a logic section containing a control microprocessor, a memory, or both. Each RFID reader transmits an RF interrogating signal, and each RFID tag, which senses the interrogating RF signal, responds by transmitting a return RFID receive signal. The RFID tag either generates the return RFID receive signal originally, or reflects back a portion of the interrogating RF signal in a process known as backscatter.

It is known to encode the RFID tag with an Electronic Product Code (EPC) identifier, which provides a unique identity for every physical item. The format and structure of the EPC identifier are defined in the EPCglobal Tag Data Standard, which is an open standard freely available from EPCglobal, Inc. The aforementioned return RFID receive signal is decoded into data by each reader, which thereby identifies, counts, or otherwise interacts with the associated item. The decoded data, also known as a payload, can denote a serial number, a manufacturer, a price, a date, a destination, another attribute(s), or any combination of attributes, and so on.

The RFID system is often used in an inventory monitoring application. For example, in order to take inventory of RFID-tagged items in a retail store, it is known to position one or more RFID readers overhead in the store, and then, to allow each reader to automatically read whatever tagged items are in the coverage range of each reader. The RFID system can also be used for locationing applications, i.e., for estimating and determining the location or bearing, i.e., the angular direction both in azimuth and elevation, of any particular tag relative to a particular reader or readers.

Yet, as advantageous as the known RFID system has been in accurately locating, monitoring, and tracking inventory items, experience has shown that there are times when real-world conditions may sometimes degrade the reading performance of the system. Typically, the tag environment is quite dense, because there is a multitude of tags in the venue, and at least some of the tags are in the process of being moved, or have already been moved once or several times, through the venue. Often, not all the tags are of interest, and sometimes, it is desirable to interrogate only tags that are deemed to be of interest. However, the known RFID system typically interrogates all the tags, thereby wasting time and processing on reading the tags of no interest. In addition, individual tag tracking can be challenging due to the time that it takes to quiet tags of no interest. Moreover, the venue may contain shelving, fixtures, equipment, vehicles, and the like, not to mention the floor, the ceiling and the room walls, each or all of which can reflect and scatter the interrogating RF signal and/or the return RFID receive signal, thereby compromising the reading performance due to multi-path reflections, destructive interference among signals and with stray signals, ambient temperature variations, etc.

Accordingly, there is a need to locate, monitor, and track RFID tags, especially only those of interest, in a venue, especially in a real-world environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
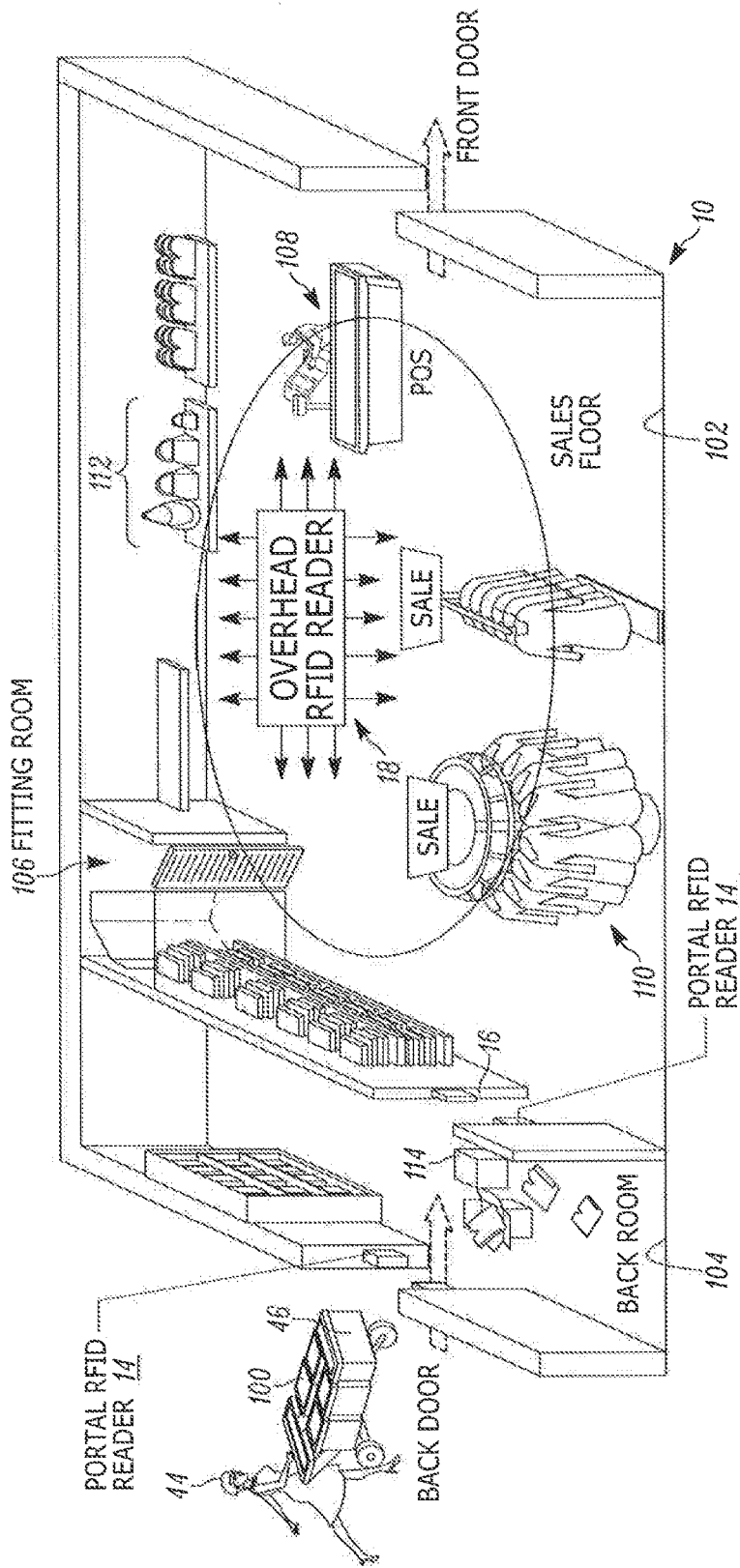
FIG. 1 is a perspective, schematic view of an exemplary radio frequency identification (RFID) tag reading system for enhanced reading and tracking of RFID tags associated with items in a venue in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a radio frequency (RF) identification (RFID) tag reading system for enhanced reading and tracking of RFID tags associated with items in a venue. The venue may be a retail store, a warehouse, or any other confined or open area in which RFID-tagged items are to be located and/or monitored, and/or tracked. The system includes a portal RFID reader for reading the RFID tags that pass through a portal in the venue, a controller operatively connected to the portal reader and operative for identifying the tags that passed through the portal as tags having a higher priority as compared to other RFID tags in the venue that have a lower priority, and an overhead RFID reader spaced away from the portal reader and operatively connected to the controller. The overhead reader receives the identities of the high-priority tags from the controller, and preferentially reads the high-priority tags over the low-priority tags in the venue, for example, by reading the high-priority tags for a longer reading time as compared to a reading time spent in reading the low-priority tags. The overhead reader and the controller together locate and track only the high-priority RFID tags in the venue.

In a preferred embodiment, each RFID tag is encoded with an Electronic Product Code (EPC) identifier in which a Universal Product Code (UPC) identifier is mapped, and the controller extracts the UPC identifier from the EPC identifier. The controller generates a list of UPC identifiers, and transmits the list to the overhead reader for identifying the high-priority tags to be preferentially read. The list is preferably stored in a database of a host server.

A method, in accordance with another aspect of the present disclosure, of enhanced reading and tracking of radio frequency (RF) identification (RFID) tags associated with items in a venue, is performed by reading the RFID tags that pass through a portal in the venue with a portal RFID reader, by identifying the tags that passed through the portal as tags having a higher priority as compared to other RFID tags in the venue that have a lower priority, by transmitting the identities of the high-priority tags to an overhead RFID reader, by preferentially reading the high-priority tags over the low-priority tags in the venue by operation of the overhead reader, and by locating and tracking only the high-priority RFID tags in the venue.

Turning now to the drawings, FIG. 1 depicts a venue 10 (as shown, a retail store), which can be any confined or open area in which RFID-tagged items are to be located, and/or monitored, and/or tracked. Reference numeral 12 in FIG. 2 identifies a radio frequency (RF) identification (RFID) tag reading system for reading and tracking RFID tags associated with the items in the venue 10. The system 12 includes at least one portal RFID reader 14 located at a portal 16, at least one overhead RFID reader 18 spaced away from the portal reader 14, and a host server 20 operatively connected, either by wired or wireless links, to the portal reader 14 and the overhead reader 18.

As shown in FIG. 1, the venue 10 has a retail sales floor 102, a backroom 104, a fitting room 106, a point-of-sale (POS) station 108, and a plurality of RFID-tagged items, e.g., clothes 110, handbags 112, cartons 114, etc., arranged on shelves, hangers, racks, on the floor, etc. in the venue 10. It will be understood that, in some applications, the server 20 is preferably located in the backroom 104, well away from the sales floor 102, but could be mounted anywhere including at the POS station 108. Each RFID-tagged item 110, 112, 114 is preferably associated with a passive RFID tag 100, e.g., not battery-operated, for cost reduction reasons, although other types of RFID tags may be employed. It will be further understood that, in some applications, for example, in a warehouse, each RFID tag 100 is associated with a pallet or container for multiple items.

Although multiple overhead readers are typically deployed in a venue, to simplify the drawing, only one overhead reader 18 has been illustrated in FIG. 1, and the overhead reader 18 has been illustrated as being preferably located overhead on the ceiling above the sales floor 102. It will be still further understood that more than one overhead reader 18 could be deployed in the venue, and not necessarily deployed on the ceiling. Although a portal reader 14 has been shown at the back door leading from an unloading dock to the backroom 104, and another portal reader 14 has been shown at the door leading from the backroom 104 to the sales floor 102, it will be understood that a portal reader need not be provided at every door, or at any door. As used herein, the term portal reader is intended to mean a transition reader for reading tags that pass by the transition reader, and can be an overhead reader, including one of the overhead readers 18. As used herein, the term portal is intended to mean any area or transition through which the tags pass. Each overhead reader 18 and each portal reader 14 may be powered from an electrical outlet, powered over the Ethernet (POE), or can be battery powered.

Figure 2:
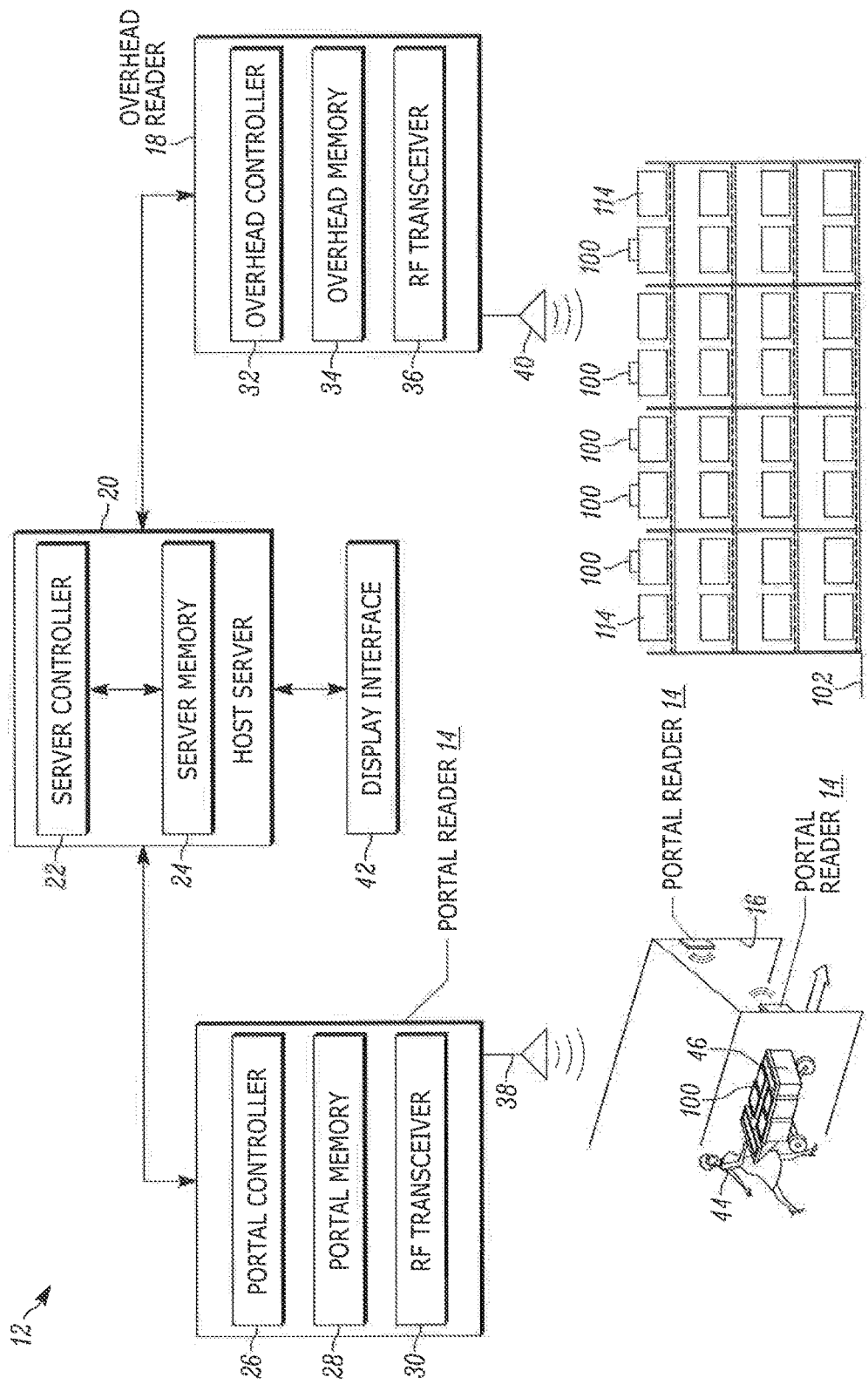
FIG. 2 is a perspective, schematic view of the system of FIG. 1 depicting how some of the components of the system are interconnected.

As shown in FIG. 2, the host server 20 has a server controller 22 and a server memory or database 24. Each portal reader 14 has a portal controller 26, a portal memory or database 28, and an RF transceiver 30 to transmit and/or receive signals from the tags 100. Each overhead reader 18 has an overhead controller 32, an overhead memory or database 34, and an RF transceiver 36 to transmit and/or receive signals from the tags 100. Each portal reader 14 and each overhead reader 18 has an array or plurality of antenna elements 38, 40, preferably a beamforming array, or a phased array, to transmit a steerable transmit RF beam and/or receive a steerable receive RF beam.

The server controller 22 is a programmed microprocessor that controls the operation of each portal reader 14 and each overhead reader 18. The server 20 comprises one or more computers and is in wired, wireless, direct, or networked communication with a human/machine interface 42, e.g., a graphical user interface (GUI), that presents information in pictorial and/or textual form to a human user, and to initiate and/or alter the execution of various processes that may be performed by the server 20 and/or by the server controller 22. The server 20 and the interface 42 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 42 can be in a smartphone, or tablet, etc., while the server 20 may be a computer, either located on the sales floor 102, or remotely at some other location, or can be hosted in a cloud server. The server 20 may advantageously include a wireless RF transceiver that communicates with each reader 14, 18. For example, Wi-Fi and Bluetooth® are open wireless standards for exchanging data between electronic devices.

In accordance with this disclosure, each portal reader 14, under the control of the server controller 22 and/or the portal controller 26, reads the RFID tags 100 that pass through a respective portal 16 in the venue 10, for example, by steering the RF beams across the portal 16. Thus, as shown, in FIGS. 1-2, a worker 44 unloads merchandise from a truck (not illustrated) to an unloading bay, and then moves the unloaded merchandise associated with the tags 100 on a wheeled cart 46 or the like through the portal 16 into the back room 104, where subsequently, the merchandise may be moved through another portal 16 to the sales floor 102. The portal controller 26 and/or the server controller 22 identify the tags 100 that have passed through the portal 16 as tags having a higher priority as compared to other RFID tags in the venue 10 that have a lower priority. For example, any tag in motion may be considered a high-priority tag. Or, any tag being moved to the sales floor 102 may be considered a high-priority tag.

Figure 3:
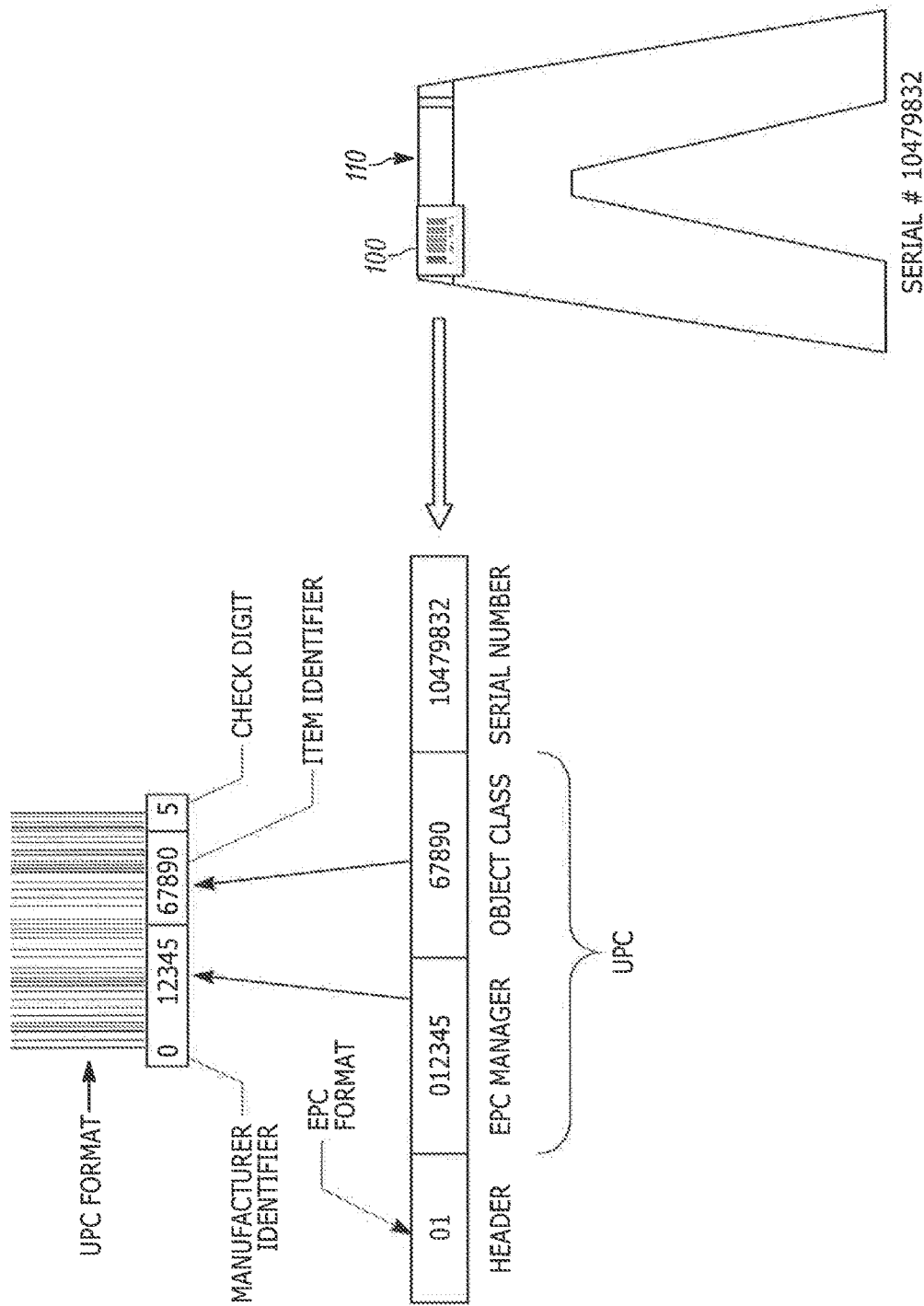
FIG. 3 is a diagram depicting how a UPC identifier is mapped onto an EPC identifier.

In a preferred embodiment, as best shown in FIG. 3, each RFID tag 100 is associated with an item of clothing 110 and is encoded with an Electronic Product Code (EPC) identifier in which a Universal Product Code (UPC) identifier is mapped. More particularly, the EPC identifier has a plurality of data fields, including a header field, an EPC manager field, an object class field, and a serial number field. The UPC identifier has a plurality of data fields, including a manufacturer identifier field, an item identifier field, and a check digit field. The manufacturer identifier field corresponds to the EPC manager field, and the item identifier field corresponds to the object class field.

The server controller 22 and/or the portal controller 26 extracts the UPC identifier from the EPC identifier from each RFID tag 100 that passes through the portal 16, generates a list of UPC identifiers, and transmits the list to the overhead reader 18 for identifying the high-priority tags based on the UPC identifiers. The list may be stored in the overhead memory 34 and/or in the server memory 24. The overhead reader 18 receives the identities of the high-priority tags 100 from the memories 34, 24, and, under the control of the server controller 22 and/or the overhead controller 32, preferentially reads the high-priority tags 100 over the low-priority tags in the venue, for example, by steering the RF beams across the sales floor 102. The preferential reading of the high-priority tags 100 is performed by reading the high-priority tags for a longer reading time as compared to a reading time spent in reading the low-priority tags.

The overhead reader 18 and the controller, which may include the server controller 22 and/or the overhead controller and/or the portal controller 26, are together operative for locating, monitoring, and tracking only the high-priority RFID tags 100 in the venue 10. Targeting of the high-priority tags is performed by transmitting UPC masks during a select process. Less time is spent reading the low-priority tags, thereby enhancing the efficiency and speed of the reading performance of the system. In some cases, only 1% to 5% of the total population of the tags at a venue may be designated as high-priority tags. Position updates on the high-priority tags may therefore be generated much more frequently and much more accurately than heretofore. The locations, the movement, and the destinations of the high-priority RFID tags in the venue may be stored in the server memory 24 for access by the server controller 22 for further processing, e.g., for the generation of inventory reports.

Figure 4:
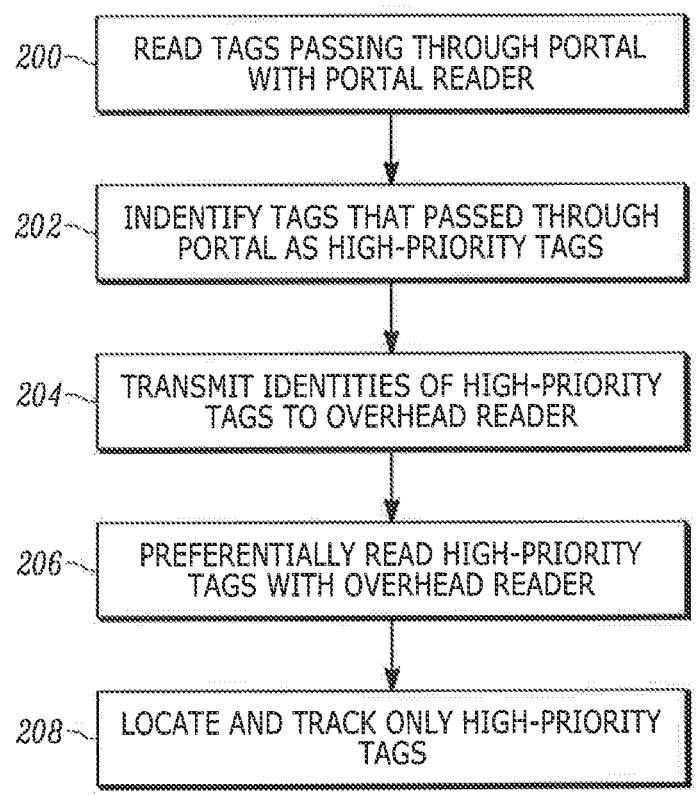
FIG. 4 is a flow chart depicting steps performed in accordance with a method of enhanced reading and tracking of RFID tags associated with items in a venue in accordance with the present disclosure.

As shown in the flow chart of FIG. 4, the method of this disclosure is performed by reading the RFID tags 100 that pass through a portal 16 in the venue 10 with a portal RFID reader 14 in step 200, by identifying the tags 100 that passed through the portal 16 as tags 100 having a higher priority as compared to other RFID tags in the venue that have a lower priority in step 202, by transmitting the identities of the high-priority tags 100 to an overhead RFID reader 18 in step 204, by preferentially reading the high-priority tags 100 over the low-priority tags in the venue by operation of the overhead reader 18 in step 206, and by locating and tracking only the high-priority RFID tags 100 in the venue in step 208.

In the foregoing specification, specific embodiments have been described. However, one of ordinary skill in the art appreciates that various modifications and changes can be made without departing from the scope of the invention as set forth in the claims below. For example, rather than relying solely on the portal reader 14 to identify the high-priority tags, an auxiliary device, for example, a video camera, a Bluetooth-enabled device, or a micro-location device could be employed. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for enhanced reading and tracking of RFID tags associated with items in a venue, comprising:
   a portal RFID reader for reading the RFID tags that pass through a portal in the venue;
   a controller operatively connected to the portal RFID reader, and operative for identifying the tags that passed through the portal and were read by the portal RFID reader as tags having a higher priority as compared to other RFID tags in the venue that did not pass through the portal and were not read by the portal RFID reader and have a lower priority; and
   an overhead RFID reader spaced away from the portal RFID reader and operatively connected to the controller, for receiving the identities of the high-priority tags, read by the portal RFID reader, from the controller, and for preferentially reading the high-priority tags over the low-priority tags in the venue, the overhead reader and the controller being together operative for locating and tracking only the high-priority RFID tags in the venue.

2. The system of claim 1, wherein each RFID tag is encoded with an Electronic Product Code (EPC) identifier in which a Universal Product Code (UPC) identifier is mapped, and wherein the controller is further operative for extracting the UPC identifier from the EPC identifier.

3. The system of claim 2, wherein the controller is operative for generating a list of UPC identifiers, and for transmitting the list to the overhead reader for identifying the high-priority tags to be preferentially read.

4. The system of claim 1, wherein the controller is operative for preferentially reading the high-priority tags by reading the high-priority tags for a longer reading time as compared to a reading time spent in reading the low-priority tags.

5. The system of claim 1, and a host server having a server controller, and wherein the portal reader has a portal controller, and wherein the overhead reader has an overhead controller, and wherein the controller is located in at least one of the server controller, the portal controller, and the overhead controller.

6. The system of claim 1, and a memory for storing the identities of the high-priority tags, and a host server having a server memory, and wherein the portal reader has a portal memory, and wherein the overhead reader has an overhead memory, and wherein the memory is located in at least one of the server memory, the portal memory, and the overhead memory.

7. The system of claim 1, and a host server having a server controller and a server memory, and wherein the overhead reader and the controller track locations and movement of the high-priority RFID tags in the venue, and store the locations and movement of the high-priority RFID tags in the server memory for access by the server controller.

8. The system of claim 1, wherein the portal reader is located between a backroom and a sales floor in a retail venue.

9. A radio frequency (RF) identification (RFID) tag reading system for enhanced reading and tracking of RFID tags that are associated with items in a venue and that are encoded with Electronic Product Code (EPC) identifiers in which Universal Product Code (UPC) identifiers are mapped, comprising:
   a portal RFID reader for reading the RFID tags that pass through a portal in the venue;
   a controller operatively connected to the portal RFID reader, and operative for identifying the tags that passed through the portal and were read by the portal RFID reader as tags having a higher priority as compared to other RFID tags in the venue that did not pass through the portal and were not read by the portal RFID reader and have a lower priority, by extracting the UPC identifiers from the EPC identifiers, and by generating a list of the UPC identifiers; and
   an overhead RFID reader spaced away from the portal RFID reader and operatively connected to the controller, for receiving the identities of the high-priority tags, read by the portal RFID reader, from the list of the UPC identifiers generated by the controller, and for preferentially reading the high-priority tags over the low-priority tags in the venue by reading the high-priority tags for a longer reading time as compared to a reading time spent in reading the low-priority tags, the overhead reader and the controller being together operative for locating and tracking only the high-priority RFID tags in the venue.

10. A method of enhanced reading and tracking of radio frequency (RF) identification (RFID) tags associated with items in a venue, the method comprising:
   reading the RFID tags that pass through a portal in the venue with a portal RFID reader;
   identifying the tags that passed through the portal and were read by the portal RFID reader as tags having a higher priority as compared to other RFID tags in the venue that did not pass through the portal and were not read by the portal RFID reader and have a lower priority;
   transmitting the identities of the high-priority tags, read by the portal RFID reader, to an overhead RFID reader;
   preferentially reading the high-priority tags over the low-priority tags in the venue by operation of the overhead reader; and
   locating and tracking only the high-priority RFID tags in the venue.

11. The method of claim 10, and encoding each RFID tag with an Electronic Product Code (EPC) identifier in which a Universal Product Code (UPC) identifier is mapped, and wherein the identifying is performed by extracting the UPC identifier from the EPC identifier.

12. The method of claim 11, and generating a list of UPC identifiers, and transmitting the list to the overhead reader for identifying the high-priority tags to be preferentially read.

13. The method of claim 10, wherein the preferential reading is performed by reading the high-priority tags for a longer reading time as compared to a reading time spent in reading the low-priority tags.

14. The method of claim 10, wherein the tracking and locating are performed by storing the locations and movement of the high-priority RFID tags in a database.

15. The method of claim 10, and locating the portal reader between a backroom and a sales floor in a retail venue.

* * * * *